United States Patent
Beukema et al.

(10) Patent No.: US 7,149,220 B2
(45) Date of Patent: Dec. 12, 2006

(54) SYSTEM, METHOD, AND PRODUCT FOR MANAGING DATA TRANSFERS IN A NETWORK

(75) Inventors: Bruce Leroy Beukema, Hayfield, MN (US); Thomas Anthony Gregg, Highland, NY (US); Danny Marvin Neal, Round Rock, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 10/132,456

(22) Filed: Apr. 25, 2002

(65) Prior Publication Data

US 2003/0202519 A1 Oct. 30, 2003

(51) Int. Cl.
*H04L 12/56* (2006.01)
(52) U.S. Cl. ........................ 370/394; 370/412
(58) Field of Classification Search .............. None
See application file for complete search history.

(56) References Cited

U.S. PATENT DOCUMENTS

| | | | | |
|---|---|---|---|---|
| 5,857,188 | A * | 1/1999 | Douglas | 707/9 |
| 6,545,981 | B1 * | 4/2003 | Garcia et al. | 370/242 |
| 2005/0036447 | A1 * | 2/2005 | Mawhinney et al. | 370/230 |

FOREIGN PATENT DOCUMENTS

| | | |
|---|---|---|
| WO | WO 97/28505 | 8/1997 |
| WO | WO 99/35793 | 7/1999 |
| WO | WO 00/52883 | 9/2000 |

OTHER PUBLICATIONS

"Infiniband Architecture Release 1.0, Volume 1, General Specifications", Oct. 24, 2000, pp. 1-880.

* cited by examiner

*Primary Examiner*—Duc Ho
(74) *Attorney, Agent, or Firm*—Duke W. Yee; Thomas E. Tyson; Wayne P. Bailey (57) ABSTRACT

A method, system, and product in a data processing system are disclosed for managing data transmitted from a first end node to a second end node included in the data processing system. A logical connection is established between the first end node and the second end node prior to transmitting data between the end nodes. An instance number is associated with this particular logical connection. The instance number is included in each packet transmitted between the end nodes while this logical connection remains established. The instance number remains constant during this logical connection. The instance number is altered, such as by incrementing it, each time a logical connection between these end nodes is reestablished. Thus, each packet is associated with a particular instance of the logical connection. When a packet is received, the instance number included in the packet may be used to determine whether the packet is a stale packet transmitted during a previous logical connection between these end nodes.

69 Claims, 6 Drawing Sheets

SYSTEM, METHOD, AND PRODUCT FOR MANAGING DATA TRANSFERS IN A NETWORK

BACKGROUND OF THE INVENTION

1. Technical Field

The present invention relates generally to the field of computer systems and, more specifically to a data processing system, method, and product for managing data transfers in a network.

2. Description of Related Art

Many existing computer systems use a shared-bus architecture, such as Peripheral Component Interconnect (PCI), as a means of transmitting data internally within the computer system among the system's various processors and I/O devices. These existing shared-bus architectures have not kept pace with the increase in the performance of typical processors. Thus, a new architecture, commonly called "Infiniband", has been developed for transmitting data among processors and I/O devices internally within a computer system. This new architecture is capable of providing greater bandwidth and increased expandability.

The new architecture provides a system-area network which includes a channel-based, switched-fabric technology. In such a system-area network (SAN), data is transmitted via messages which are made up of packets. Each device, whether it is a processor or I/O device, includes a channel adapter. The messages are transmitted from one device's channel adapter to another device's channel adapter via switches. Each channel adapter may also be referred to as an "end node".

Figure 1:
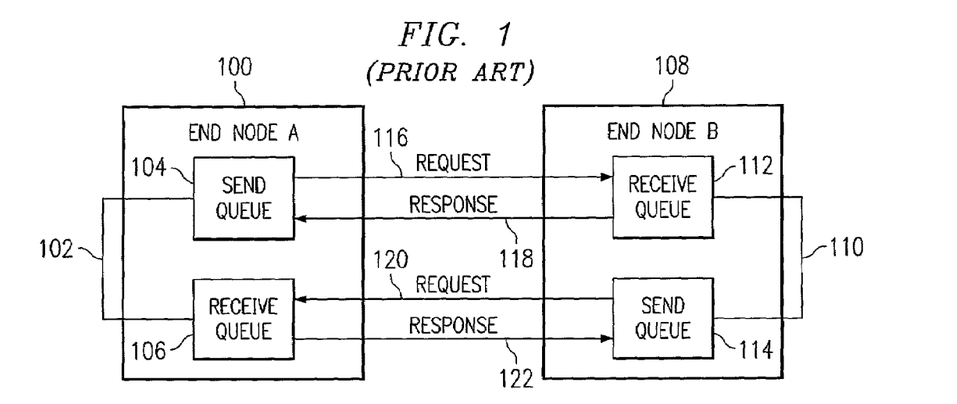
FIG. 1 depicts two end nodes, each including a queue pair, in accordance with the prior art.

FIG. 1 depicts two end nodes, each including a queue pair, in accordance with the prior art. When end node A 100 needs to transmit data to end node B 108, a logical connection is established between a queue pair included in end node A and a queue pair included within end node B. Data is then transmitted from the send queue of the queue pair in end node A to the receive queue of the queue pair in end node B. Responses are transmitted from the send queue of the queue pair in end node B to the receive queue of the queue pair in end node A. End node A 100 includes a queue pair 102. Queue pair 102 includes a send queue 104 and a receive queue 106. End node B 108 includes a queue pair 110. Queue pair 110 includes a receive queue 112 and a send queue 114. Requests are sent from send queues to receive queues and responses are sent from receive queues back to send queues. Request 116 is acknowledged by response 118. Request 120 is acknowledged by response 122.

Messages, and thus packets, may be transmitted utilizing one of five different transport types: Reliable Connected (RC), Reliable Datagram (RD), Unreliable Connected (UC), Unreliable Datagram (UD), or Raw Datagram (RawD). When the Reliable Connected transport type is used, sequence numbers are included in each packet, and packet transfers are acknowledged.

Starting sequence numbers are established when a logical connection is established between two end points. Each time a packet is transmitted, the sequence number is incremented and included within the packet. Thus, a packet's sequence number is used to identify the position of the packet within a sequence of packets.

In the prior art, a particular set of bits, or a field, is included in each packet to indicate the sequence number. Thus, the sequence number is this entire set of bits.

The packet sequence number (PSN) that is included in request 116 is the same as the PSN that is included in response 118. The PSN that is included in request 120 is the same as the PSN that is included in response 122. The PSN included in request 116 and response 118 has no relationship to the PSN included in request 120 and response 122 even though they are all using the same set of queue pairs.

Normally, the requester node increments the PSN by one in each request packet transmitted. The responder node compares the PSN in the received requests to its own PSN (expected PSN) that the responder also increments by one each time a request packet is received. If the PSNs match, the responder may then send a response to the request (acknowledgment) using the same PSN that was included in the request packet being acknowledged. Then back at the requester, the PSN in the response packet is compared to the requester's response PSN to see if it is the same as its own response PSN (expected PSN) that the requester also increments by one.

The requester is allowed to send multiple packets without receiving a response packet. The response packets may be received by the requester some time later, but the PSNs in these response packets are compared to the requester's response PSN counter. If all of the request packet PSNs match the responder's internal PSN and all of the response packet PSNs match the requester's internal PSN, all of the packets have been successfully transferred from one end node to another (from a send queue to a receive queue).

There are two abnormal conditions that must be detected and resolved at the responder to ensure reliable operation. The first condition is the duplicated packet, and the second condition is the invalid packet.

Figure 2:
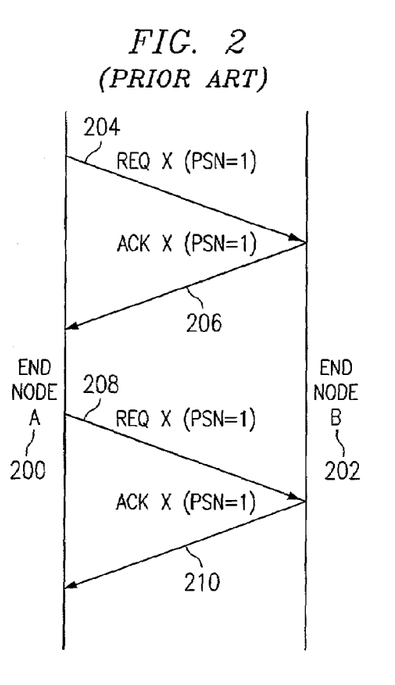
FIG. 2 illustrates a ladder diagram which depicts the transmission of duplicate packets in accordance with the prior art.

Duplicated packets are detected at the responder when the requester sends a request packet more than once. The requester will send packets more than once when it detects that the packet may have been lost. FIG. 2 illustrates a ladder diagram which depicts the transmission of duplicate packets in accordance with the prior art. Request packet 204, which includes a PSN=1, is transmitted by end node 200 and is received by the responder, end node 202. The response, acknowledgment 206 which includes a PSN=1, is either lost or delayed. In this case the requester, end node 200, detects a time-out condition and resends the same request as request 208 which includes the same PSN (PSN=1). The responder, end node 202, determines that the PSN is a duplicate (i.e. it has a PSN 'earlier' than end node's 202 internal count), and the responder sends the response again as acknowledgment 210 with the same PSN (PSN=1).

Figure 3:
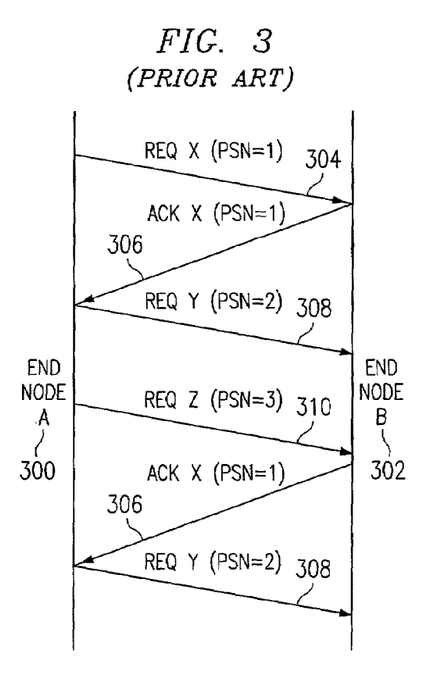
FIG. 3 illustrates a ladder diagram which depicts the receipt of an invalid packet in accordance with the prior art.

An invalid packet is detected at the responder when the responder receives a packet with a PSN 'ahead' of its internal count. FIG. 3 illustrates a ladder diagram which depicts the receipt of an invalid packet in accordance with the prior art. The requester, end node 300, transmits a request 304 which includes a PSN=1, a request 308 which includes a PSN=2, and a request 310 which includes a PSN=3. Request 304 is properly acknowledged by acknowledgment 306, which includes a PSN=1. Request 308, which includes a PSN=2 is lost in the fabric. Thus, responder, end node 302, sees request 304, having PSN=1, followed by request 310, having PSN=3. Thus, request 310 is an invalid packet. In this case, responder, end node 302 resends the acknowledgment 312 for request packet with PSN=1, and the requester resends all packets starting with request 314 having PSN=2.

At the requester, the response packets have similar rules. The duplicate packet detected by the requester is discarded. This case can only occur when a request packet is not lost but is only delayed in the fabric long enough for the requester to resend it. The second response with the duplicate PSN is discarded. The invalid PSN at the requester can occur when one or more packets in a multiple packet response are lost in the fabric. In this case, the requester resends the request.

PSNs use a fixed and finite number of bits in the transport header which is included in each packet. Therefore, the PSNs are continually reused as the counters generating them wrap from their maximum value back to zero. By using a PSN that is much larger than the number of packets that may be outstanding, requesters and responders establish a range of packet sequence numbers in the duplicate and invalid ranges.

A problem arises with PSNs when a logical connection between two end nodes is terminated (torn down) and then reestablished while packets are in flight. In this case, a packet from the old, stale connection may arrive at the responder. The responder may interpret this packet as a valid packet when it is actually a stale packet from the old connection.

One of the solutions described in the prior art is to add wait states between tearing down a logical connection established between two particular sets of queue pairs and then reestablishing the logical connection between these same two sets of queue pairs. Thus, the end nodes wait long enough for all possible stale packets from the old connection to expire. Although this solution does solve the problem, it can significantly affect the end nodes' performance, especially when connections are often torn down and then reestablished.

Therefore, a need exists for a method, system, and product for efficiently managing data transfers in a network.

SUMMARY OF THE INVENTION

A method, system, and product in a data processing system are disclosed for managing data transmitted from a first end node to a second end node included in the data processing system. A logical connection is established between the first end node and the second end node prior to transmitting data between the end nodes. An instance number is associated with this particular logical connection. The instance number is included in each packet transmitted between the end nodes while this logical connection remains established. The instance number remains constant during this logical connection. The instance number is altered, such as by incrementing it, each time a logical connection between these end nodes is reestablished. Thus, each packet is associated with a particular instance of the logical connection. When a packet is received, the instance number included in the packet may be used to determine whether the packet is a stale packet transmitted during a previous logical connection between these end nodes.

In a preferred embodiment, the instance number is included as part of the sequence number. The bits that are designated within each packet as the sequence number are divided according to the present invention as sequence number bits and instance number bits. The instance number, which remains constant for all packets during a particular logical connection, is indicated using the instance number bits. The sequence number, which is incremented for each transmitted packet, is indicated using the sequence number bits.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product in a data processing system for managing data transmitted from a first end node to a second end node. A logical connection is established between the first end node and the second end node prior to transmitting data between the end nodes. The logical connection is established between a particular queue pair included in the first end node and a particular queue pair included in the second end node.

An instance number is associated with the logical connection established between these two particular sets of queue pairs. The instance number is included in each packet transmitted between the end nodes while this logical connection remains established. Each time a logical connection is reestablished between these two sets of queue pairs, the instance number is incremented. The packets also include packet sequence numbers which are incremented each time a packet is transmitted.

The present invention implements the instance number as part of the traditional sequence number. The set of bits reserved for the prior art sequence number is divided into a sequence number set of bits and an instance number set of bits. The instance number of the present invention is indicated by the instance number set of bits. The sequence number of the present invention is indicated by the sequence number set of bits. Thus, according to the present invention, the traditional prior art sequence number is used to indicate both the instance number and the sequence number. The instance number set of bits remains constant throughout the same logical connection. The sequence number set of bits is incremented as described in the prior art each time a packet is transmitted.

The sequence number set of bits wraps around back to zero in a manner as is known in the prior art when the maximum sequence number is incremented. The instance number is not affected by the sequence number being incremented or wrapping around back to zero. The instance number remains constant as long as the logical connection has not been reestablished. Therefore, because some of the traditional sequence number bits are reserved for the instance number, the maximum sequence number is now smaller than the number that could have been represented by all of the sequence number bits.

The data processing system of the present invention is a distributed computing system having end nodes, switches, routers, and links interconnecting these components. Each end node uses send and receive queue pairs to transmit and receives messages. The end nodes segment the message into packets and transmit the packets over the links. The switches and routers interconnect the end nodes and route the packets to the appropriate end node. The end nodes reassemble the packets into a message at the destination.

In a preferred embodiment of the present invention, the queue pairs are used to associate the instance number with a logical connection between particular sets of queue pairs. When a logical connection is first established between a first and second end node, a queue pair in the first end node is associated with a queue pair in the second end node, typically utilizing a queue pair table. Thus, each time a logical connection is established between two sets of queue pairs, the queue pair table may be utilized to determine if these two sets of queue pairs have already been associated. If these two sets of queue pairs have already been associated, a logical connection between these two sets of queue pairs is being reestablished and the instance number is incremented.

Figure 4:
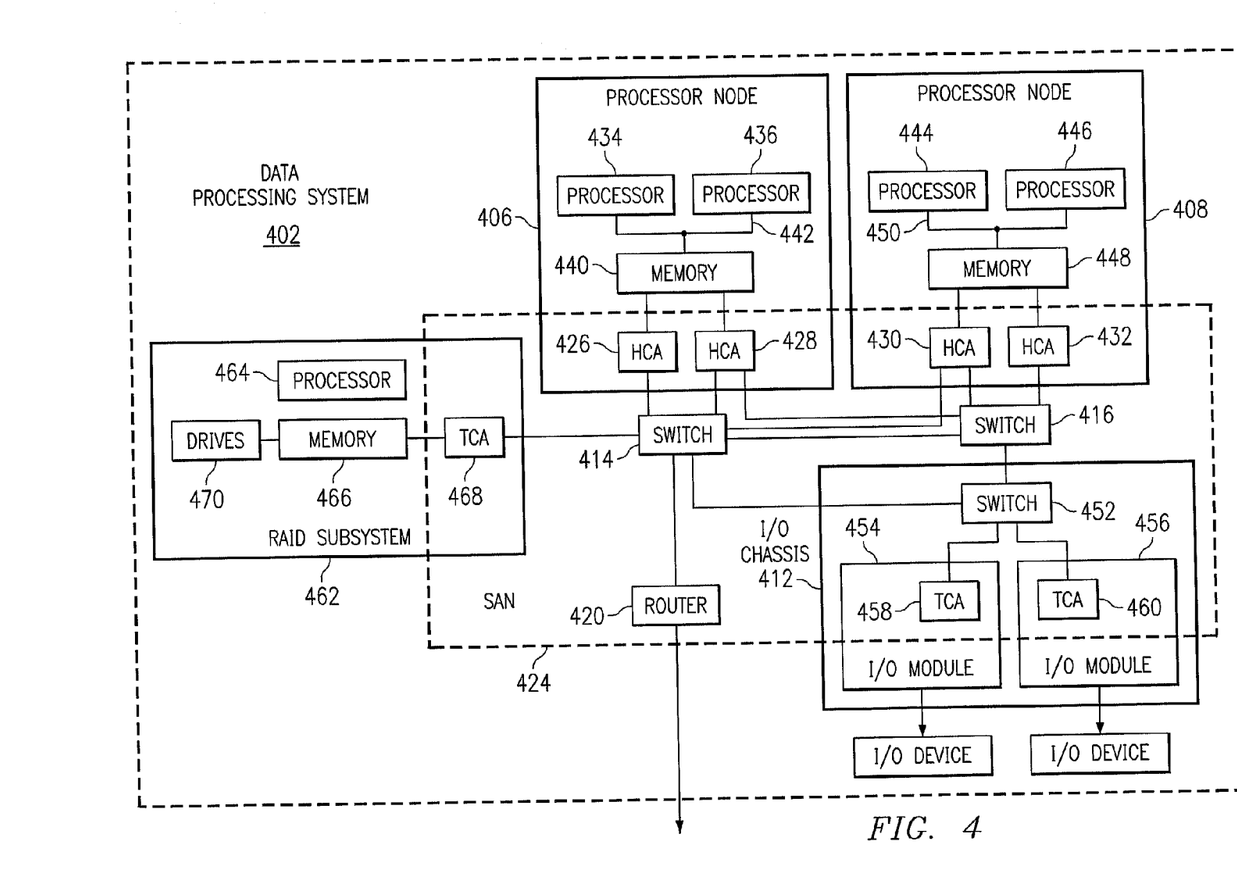
FIG. 4 depicts a data processing system that implements a channel-based, switched fabric architecture for transmitting data in accordance with the present invention.

FIG. 4 depicts a data processing system that implements a channel-based, switched fabric architecture for transmitting data in accordance with the present invention. Computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by the Internet or an intranet.

Data processing system 402 includes a storage area network 424. A storage area network may also be referred to as a "subnet". A subnet is a group of end nodes and cascaded switches that is managed as a single unit. Typically, a subnet occupies a single geographic or functional area. For example, a single computer system in one room could be defined as a subnet.

Data processing system 402 includes a high-bandwidth, low-latency network interconnecting nodes within the distributed computer system. A node is any component attached to one or more links of a network and forming the origin and/or destination of messages within the network. In the depicted example, data processing system 402 includes nodes in the form of host processor node 406, host processor node 408, redundant array independent disk (RAID) subsystem node 462, and I/O chassis node 412. The nodes illustrated in FIG. 4 are for illustrative purposes only, as SAN 424 can connect any number and any type of independent processor nodes, I/O adapter nodes, and I/O device nodes. Any one of the nodes can function as an end node, which is herein defined to be a device that originates or finally consumes messages or packets in SAN 424.

SAN 424 includes the communications and management infrastructure supporting both I/O and interprocessor communications (IPC). SAN 424 includes a switched communications fabric which allows many devices to concurrently transfer data with high-bandwidth and low latency in a secure, remotely managed environment. End nodes can communicate over multiple ports and utilize multiple paths through SAN 424.

SAN 424 includes host channel adapters (HCAs) 426, 428, 430, and 432, target channel adapters (TCAs) 458, 460, and 468, switches 414, 416, and 452, and router 420. A switch is a device that connects multiple links together and allows routing of packets from one link to another link within a subnet using a small header Destination Local Identifier (DLID) field. Generally, a switch can route packets from one port to any other port on the same switch.

A router is a device that connects multiple subnets together and is capable of routing packets from one link in a first subnet to another link in a second subnet using a large header Destination Globally Unique Identifier (DGUID).

A link is a full duplex channel between any two network fabric elements, such as end nodes, switches, or routers. Example suitable links include, but are not limited to, copper cables, optical cables, and printed circuit copper traces on backplanes and printed circuit boards.

Each node in data processing system 402 includes at least one channel adapter (CA). Each channel adapter is an end point that implements the channel adapter interface in sufficient detail to source or sink packets transmitted utilizing a storage area network (SAN) 424. SAN 424 may also be referred to as a fabric. A channel adapter included in a processor node is a host channel adapter (HCA). A channel adapter included in a node other than a processor node is a target channel adapter (TCA).

Host processor node 406 contains channel adapters in the form of host channel adapter 426 and host channel adapter 428. Host processor node 408 contains host channel adapter 430 and host channel adapter 432. Host processor node 406 also includes central processing units 434 and 436, and a memory 440 interconnected by bus system 442. Host processor node 408 similarly includes central processing units 444 and 446, and a memory 448 interconnected by a bus system 450.

Host channel adapter 426 provides a connection to switch 414. Host channel adapter 428 provides a connection to switches 414 and 416. Host channel adapter 430 provides a connection to switches 414 and 416. And, host channel adapter 432 provides a connection to switch 416.

Host channel adapters are preferably implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols.

I/O chassis 412 includes an I/O switch 452 in the I/O adapter backplane to couple adapter cards to SAN 424, and multiple I/O modules 454 and 456. In this example, the I/O modules take the form of adapter cards.

Adapter cards may include a SCSI adapter card, an adapter card to fiber channel hub and fiber channel-arbitrated loop (FC-AL) devices, an Ethernet adapter card, a graphics adapter card, or a video adapter card. Any known type of adapter card can be implemented.

Each I/O module includes a target channel adapter. I/O module 454 includes target channel adapter (TCA) 458, and I/O module 456 includes target channel adapter (TCA) 460.

A RAID subsystem node 462 is also included in data processing system 402. Node 462 includes a processor 464, a memory 466, a target channel adapter (TCA) 468, and multiple redundant and/or striped storage disk unit 470. Target channel adapter 468 can be a fully functional host channel adapter.

SAN 424 provides the I/O and interprocessor communications (IPC) consumers of the distributed computer system with zero processor-copy data transfers without involving the operating system kernel process, and employs hardware to provide reliable, fault tolerant communications.

Figure 5:
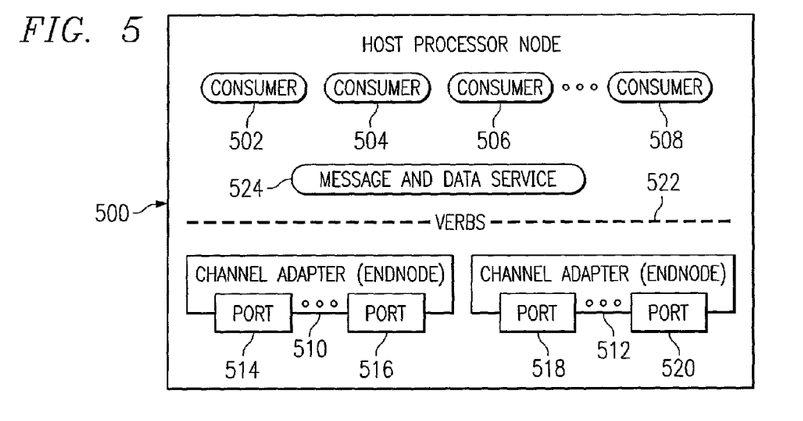
FIG. 5 is a functional block diagram of a host processor node in accordance with the present invention.

FIG. 5 is a functional block diagram of a host processor node in accordance with the present invention. Host processor node 500 is an example of a host processor node, such as host processor node 406 or 408 depicted in FIG. 4.

Host processor node 500 includes a set of consumers 502, 504, 506, and 508 which are processes executing on host processor node 500. Host processor node 500 also includes channel adapters 510 and 512. Channel adapter 510 includes ports 514 and 516 while channel adapter 512 includes ports 518 and 520. Each port connects to a link.

Consumers 502–508 transfer messages to the SAN, such as SAN 424, via the verbs interface 522 and message and data service 524. A verbs interface is essentially an abstract description of the functionality of a host channel adapter. An operating system may expose some or all of the verb functionality through its programming interface. This interface defines the behavior of the host. Message and data service 524 is a higher-level interface than the verb layer and is used to process messages and data received through channel adapters 510 and 512. Message and data service 524 provides an interface to consumers 502–508 to process messages and other data.

Figure 6:
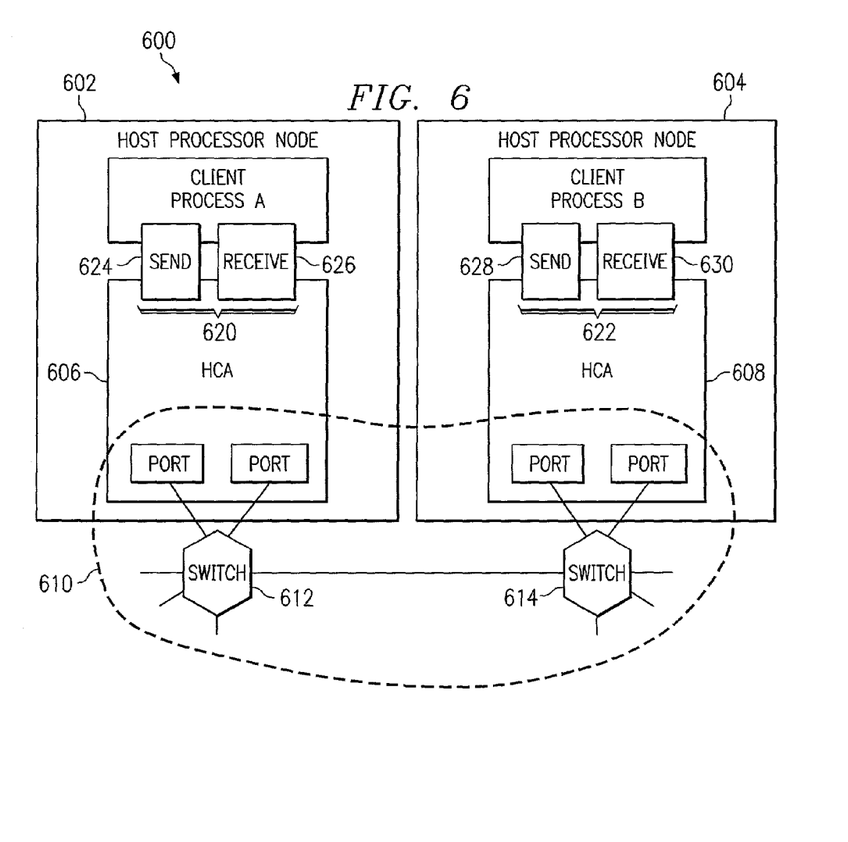
FIG. 6 illustrates a portion of a distributed computer system depicting an example request and acknowledgment transaction in accordance with the present invention.

FIG. 6 illustrates a portion of a distributed computer system depicting an example request and acknowledgment transaction in accordance with the present invention. The distributed computer system 600 in FIG. 6 includes a host processor node 602 and a host processor node 604. Host processor node 602 includes a host channel adapter 606. Host processor node 604 includes a host channel adapter 608. The distributed computer system in FIG. 6 includes a SAN fabric 610, which includes a switch 612 and a switch 614. The SAN fabric includes a link coupling host channel adapter 606 to switch 612, a link coupling switch 612 to switch 614, and a link coupling host channel adapter 608 to switch 614.

In the example transactions, host processor node 602 includes a client process A. Host processor node 604 includes a client process B. Client process A interacts with host channel adapter 606 through queue pair 620. Client process B interacts with hardware channel adapter 608 through queue pair 622.

Queue pairs 620 and 622 are structures that each include a send queue and a receive queue. A queue pair typically includes control registers within the channel adapter. Queue pair 620 includes send queue 624 and receive queue 626. Queue pair 622 includes send queue 628 and receive queue 630.

Process A initiates a message request by posting queue elements to send queue 624 of queue pair 620. Hardware in host channel adapter 606 receives the queue element in receive queue 630. Process B then reads the queue element and segments the message into packets, such as the packet illustrated in FIG. 8. Process B may initiate a message by posting queue elements to send queue 628 which are then received by Process A through receive queue 626.

Packets are routed through the SAN fabric, and for reliable transfer services, are acknowledged by the final destination end node. If not successively acknowledged, the packet is retransmitted by the source end node. Packets are generated by source end nodes and consumed by destination end nodes.

Figure 7:
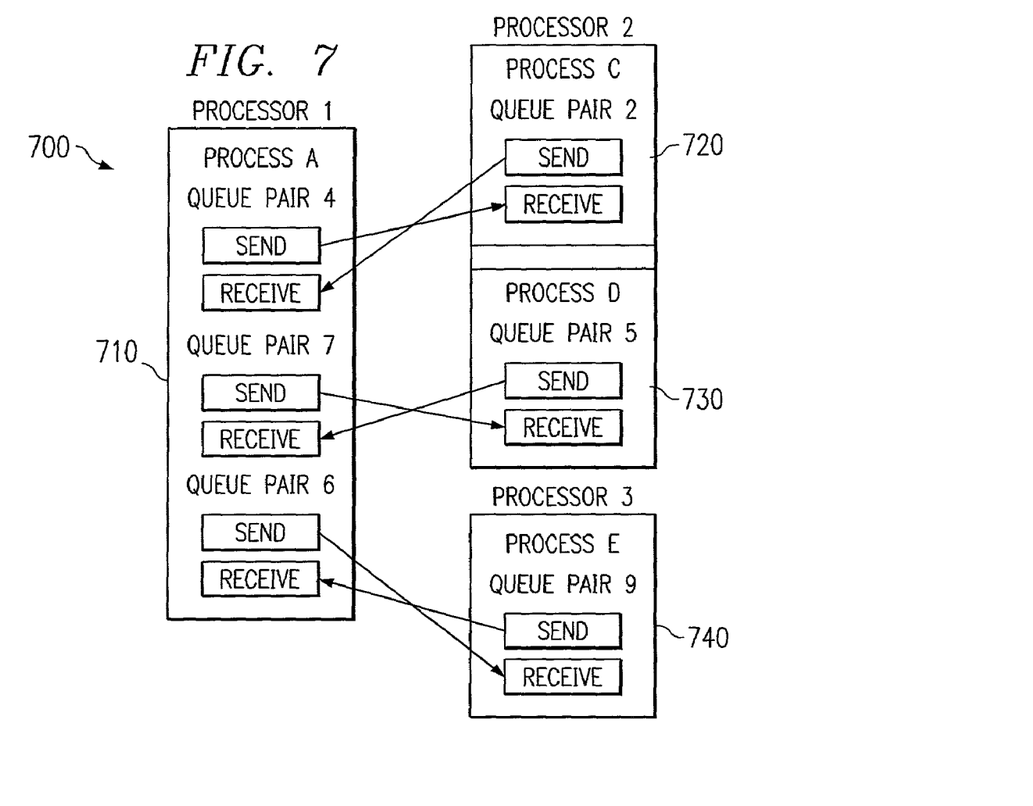
FIG. 7 depicts a portion of distributed computer system employing a reliable connection (RC) service to communicate between distributed processes in accordance with the present invention.

FIG. 7 depicts a portion of distributed computer system 100 employing a reliable connection service to communicate between distributed processes in accordance with the present invention.

When a queue pair is created, the queue pair is set to provide a selected type of transport service. A distributed computer system implementing the preferred embodiment of the present invention supports four types of transport services: reliable connected (RC), unreliable connected (UC), unreliable datagram (UD), and reliable datagram (RD).

Reliable and unreliable connected services associate a local queue pair with one and only one remote queue pair. Connected services require a process to create a queue pair for the process to use to communicate with another process over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Distributed computer system 700 in FIG. 7 includes a host processor node 1, a host processor node 2, and a host processor node 3. Host processor node 1 includes a process A 710. Host processor node 2 includes a process C 720 and a process D 730. Host processor node 3 includes a process E 740.

Host processor node 1 includes queue pairs 4, 6 and 7, each having a send queue and a receive queue. Host processor node 2 has a queue pairs 2 and 5, and host processor node 3 has queue pair 9. The reliable connection (RC) service of distributed computer system 700 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A reliable connection (RC) service is made reliable because hardware maintains sequence numbers and acknowledges all packet transfers. A combination of hardware and SAN driver software retries any failed communications. The process client of the queue pair obtains reliable communications even in the presence of bit errors, receive under-runs, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data.

Alternatively, the acknowledgment may be one that only indicates that the data has reached its destination.

Figure 8:
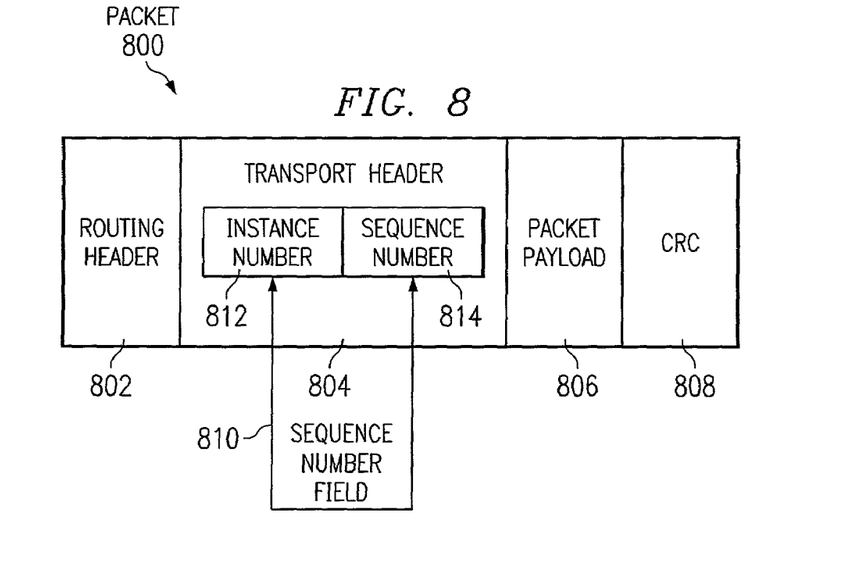
FIG. 8 illustrates a packet in accordance with the present invention.

FIG. 8 illustrates a packet in accordance with the present invention. A message, as used herein, is an application-defined unit of data exchange, which is a primitive unit of communication between cooperating processes. Messages are divided into packets. A packet is one unit of data encapsulated by networking protocol headers and/or trailers. The headers generally provide control and routing information for directing the packet through SAN. The trailer generally contains control and cyclic redundancy check (CRC) data for ensuring packets are not delivered with corrupted contents.

A packet is a unit of information that is routed through the SAN fabric. The packet is an end node-to-end node construct, and is thus created and consumed by end nodes. For packets destined to a channel adapter (either host or target), the packets are neither generated nor consumed by the switches and routers in the SAN fabric. Instead for packets that are destined to a channel adapter, switches and routers simply move request packets or acknowledgment packets closer to the ultimate destination, modifying the variant link header fields in the process. Routers also modify the packet's network header when the packet crosses a subnet boundary. In traversing a subnet, a single packet stays on a single service level.

For reliable service types, such as the reliable connection (RC) transport service, end nodes, such as host processor end nodes and I/O adapter end nodes, generate request packets and return acknowledgment packets. Switches and routers pass packets along from the source to the destination. Except for the variant CRC trailer field, which is updated at each stage in the network, switches pass the packets along unmodified. Routers update the variant CRC trailer field and modify other fields in the header as the packet is routed.

An outgoing message is split into one or more data packets. The channel adapter hardware adds a transport header and a network header to each packet. In accordance with the present invention, the transport header includes sequence numbers, an instance number, and other transport information. The network header includes routing information, such as the destination IP address and other network routing information. The link header contains the Destination Local Identifier (DLID) or other local routing information. The appropriate link header is always added to the packet. The appropriate global network header is added to a given packet if the destination end node resides on a remote subnet.

If a reliable transport service is employed, when a request data packet reaches its destination end node, acknowledgment data packets are used by the destination end node to let the request data packet sender know the request data packet was validated and accepted at the destination. Acknowledgment data packets acknowledge one or more valid and accepted request data packets. The requester can have multiple outstanding request data packets before it receives any acknowledgments. In one embodiment, the number of multiple outstanding messages, i.e. request data packets, is determined when a queue pair is created.

Packet 800 includes a routing header 802, a transport header 804, a packet payload 806, and a CRC 808. Routing header 802 is used to identify ports within a channel adapter of source and destination end nodes for packet payload 806.

Transport header 804 specifies the destination queue pair for packet payload 806. A sequence number field 810 is located in transport header 804. In the prior art, the sequence number was represented by all of the bits included in sequence number field 810. However, according to the present invention, a sequence number and an instance number are both represented by all of the bits of sequence number field 810. In accordance with the present invention, the sequence number includes both an instance portion 812 and a sequence portion 814. Thus, the sequence numbers of the present invention include both a sequence portion which is incremented with each packet, and an instance portion which remains constant during each logical connection.

Transport header 804 also provides information such as the operation code, and partition for packet payload 806. CRC 808 is used for error checking.

The operating code identifies whether the packet is the first, last, intermediate, or only packet of a message. The operation code also specifies whether the operation is a send RDMA write, read, or atomic.

In accordance with the present invention, an instance number is stored in field 812 for each packet. The instance number remains constant during an instance of a logical connection. If a logical connection is torn down and later reestablished, the instance number is incremented. This incremented instance number is then stored in field 812 for each packet transmitted using this reestablished logical connection.

Each time a packet is transmitted, the sequence portion 814 is incremented.

Figure 9:
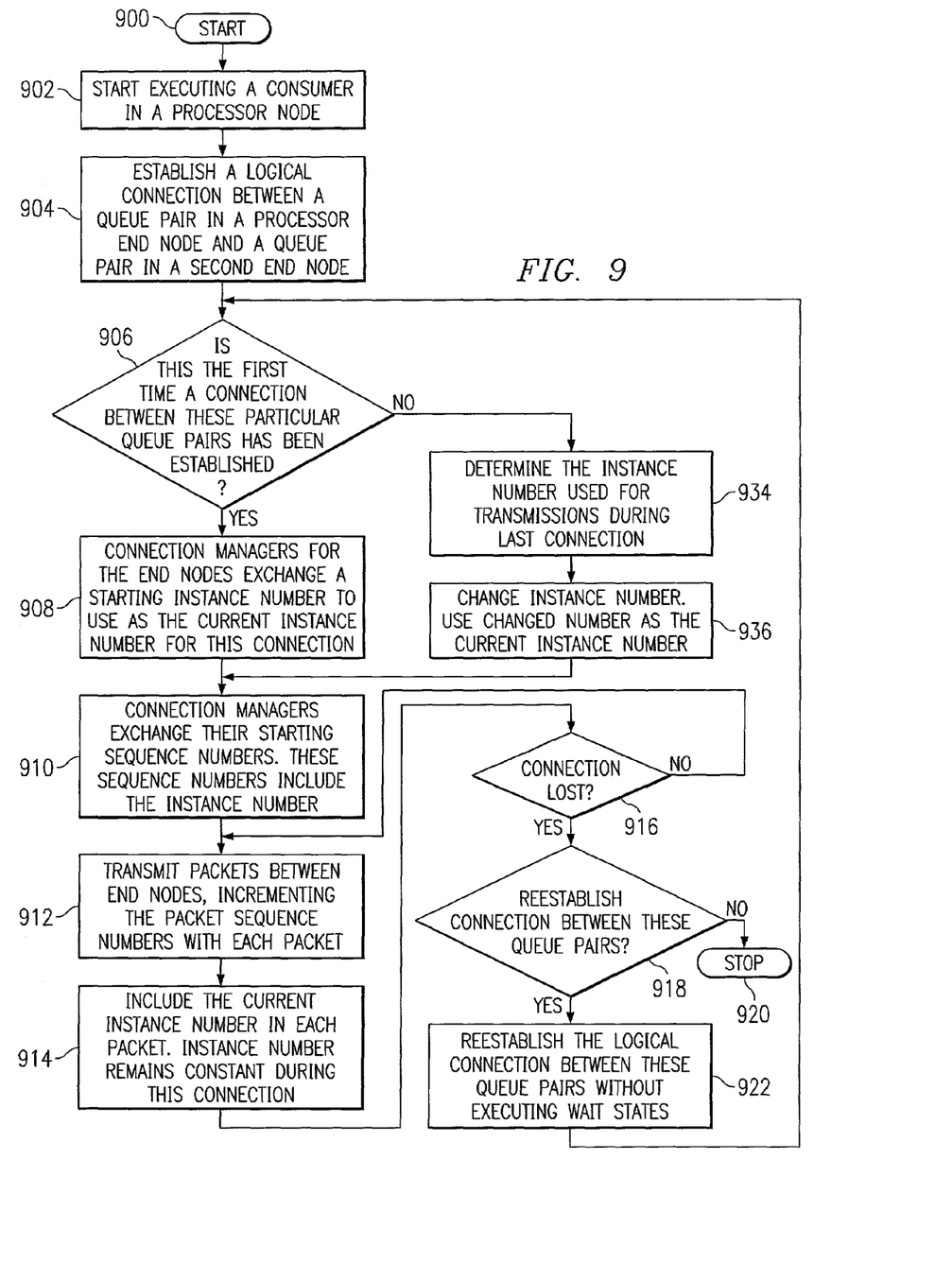
FIG. 9 depicts a high level flow chart which illustrates including an instance number in each packet in accordance with the present invention.

FIG. 9 depicts a high level flow chart which illustrates including an instance number in each packet in accordance with the present invention. The process starts as depicted by block 900 and thereafter passes to block 902 which illustrates starting the execution of a consumer in a processor node. Next, block 904 depicts establishing a logical connection between the processor end node and the second end node. When a logical connection between these end nodes is established, a send and receive queue pair in the first end node is associated with a send and receive queue pair in the second end node. This association may be made using a table of queue pairs maintained in each end node by the end node's communication manager.

Thereafter, block 906 illustrates a determination by the processor end node of whether or not this is the first time a logical connection has been established between the particular queue pair in the processor end node and the particular queue pair in the second end node. An end node may use the table of queue pairs to determine whether this is the first time a logical connection has been established. The table of queue pairs will indicate whether a logical connection has already been established. When a logical connection is torn down, the queue pairs in both end nodes are put into an idle state and are no longer associated together. The queue pair tables in each end node will reflect the queue pairs being in an idle state.

If a logical connection had already been established and had not been torn down, the queue pairs in each end node remain associated with each other. The queue pair tables in each end node will indicate that the queue pairs are still associated with each other.

An end node may use its queue pair table to determine whether a logical connection has already been established by determining whether a queue pair has been associated with a queue pair in the second node. If a queue pair in this node is associated with a queue pair in the second node, a logical connection between these end nodes has already been established. If a queue pair in this node is not associated with a queue pair in the second node, a logical connection between these end nodes has not already been established.

Referring again to block 906, if a determination is made that this is the first time a logical connection has been established between these two particular sets of queue pairs, the process passes to block 908 which depicts the logical connection managers for each end node exchanging a starting instance number. This starting instance number becomes the current instance number and remains constant while this logical connection remains established.

The process then passes to block 910 which illustrates the logical connection managers exchanging their starting sequence numbers. The sequence number is stored in the sequence number portion of the sequence number field and does not remain constant. It is incremented each time a packet is transmitted. Further, each end node may choose its own sequence number which is unrelated to the sequence number chosen by the other end node. The instance number is stored in the instance number portion of the sequence number field and remains constant as long as this logical connection remains established.

Thereafter, block 912 depicts the transmission of packets between the end nodes incrementing the packet sequence numbers stored in the sequence number portion with each packet. Next, block 914 illustrates including the current instance number in each packet. The instance number remains constant for each packet transmitted during this logical connection.

Block 916, then, illustrates a determination of whether or not the current logical connection has been lost. If a determination is made that the current logical connection has not been lost, the process passes back to block 912. Referring again to block 916, if a determination is made that the logical connection has been lost, the process passes to block 918. Block 918 depicts a determination of whether or not to reestablish a logical connection between these two queue pairs. If a determination is made that a logical connection between these two queue pairs is not to be reestablished, the process passes to block 920. Referring again to block 918, if a determination is made to reestablish a logical connection between these two queue pairs, the process passes to block 922. Block 922 illustrates reestablishing a logical connection between these two queue pairs without requiring that any wait states be executed. The process passes back to block 906.

Referring again to block 906, if a determination is made that this is not the first time a logical connection between these two particular queue pairs has been established for this service, the process passes to block 934. Block 934 depicts determining the instance number used for transmissions during the last logical connection established for these two particular queue pairs. Next, block 936 illustrates changing the last instance number to a new instance number. This new instance number is then used as the current instance number. Although the instance number will typically be changed by incrementing the instance number, the instance number may be changed by any means, such as by decrementing the instance number. The process then passes to block 910.

Figure 10:
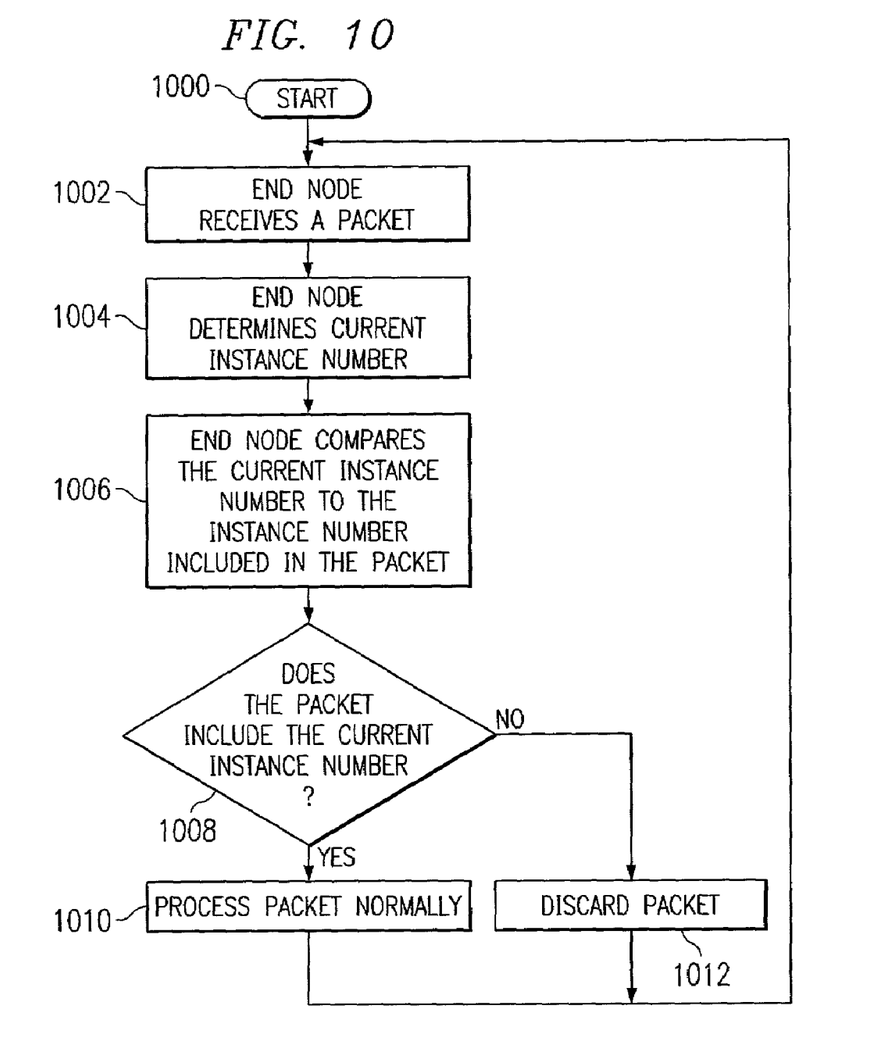
FIG. 10 illustrates a high level flow chart which depicts an end node determining whether a received packet was transmitted during the current logical connection in accordance with the present invention.

FIG. 10 illustrates a high level flow chart which depicts an end node determining whether a received packet was transmitted during the current logical connection in accordance with the present invention. The process starts as illustrated by block 1000 and thereafter passes to block 1002 which depicts an end node receiving a packet which includes an instance number. Next, block 1004 illustrates the end node determining the current instance number. Thereafter, block 1006 depicts the end EASE node comparing the current instance number to the instance number included within the received packet. The process then passes to block 1008 which illustrates a determination of whether or not the packet includes the current instance number. If a determination is made that the packet does include the current instance number, the process passes to block 1010 which depicts the end node processing the packet normally. The process then passes back to block 1002. Referring again to block 1008, if a determination is made that the packet does not include the current instance number, the process passes to block 1012 which illustrates the end node discarding the packet. The process then passes back to block 1002.

The present invention may be utilized any time a logical connection is torn down and then reestablished. Logical connections are torn down and reestablished for a variety of reasons. Many reasons are error conditions detected at the end nodes that cannot be recovered by simply re-transmitting packets. For example, malformed packets and sequencing errors can put a queue pair into this error state.

Another reason for tearing down and reestablishing a connection is path MTU changes in the fabric. The size of the maximum packet payload that can be transmitted on a link is called the maximum transmission unit (MTU). For example, consider a single link within the fabric. If the packet buffers on one side of the link handle packet payloads up to 512 bytes and the packet buffers on the other side of the link handle packet payloads up to 1025 bytes, the largest packet payload that can be transmitted over this link can be no larger than 512 bytes, the smaller of the two sides of the link. For simplicity, the packet payload size is also used when describing the size of the packet.

If the path from one node to another includes any switches and/or routers, there is more than one link in the path. In this case, the MTU is now called the path MTU and is the smallest MTU of all the links in the path. For example, if one of the links in the path has an MTU of 512 bytes and all the other links have an MTU of 4096 bytes, the largest packets that can be transmitted on the path is only 512 bytes.

If the path MTU increases as a result of a fail-over, the connection must be either drained (no new request packets are generated and all outstanding packets have been acknowledged) or torn down and reestablished to take advantage of the new, larger path MTU. This situation may be efficiently handled utilizing the present invention because the stale packet wait period is no longer necessary. The logical connection can be torn down and immediately reestablished without the need for wait states.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing data transmitted from a first end node to a second end node in a data processing system, said method comprising the steps of:

establishing a logical connection between said first end node and said second end node prior to transmitting data between said first and second end nodes;

associating an instance number with said logical connection; and including said instance number in each packet transmitted between said first and second end nodes while said logical connection remains established, said instance number remaining constant during said logical connection.

2. The method according to claim 1, further comprising the steps of:

reestablishing said logical connection between said first and second end nodes;

incrementing said instance number, said incremented instance number being associated with said reestablished logical connection; and including said incremented instance number in each packet transmitted between said first and second end nodes during said reestablished logical connection, said incremented instance number remaining constant during said reestablished logical connection.

3. The method according to claim 1, wherein the step of establishing a logical connection between said first end node and said second end node further comprises the step of:

associating a queue pair in said first end node with a queue pair in said second end node.

4. The method according to claim 3, wherein said step of associating a queue pair in said first end node with a queue pair in said second end node further comprises the steps of:

establishing a table of queue pairs in said first end node; and storing within said table an indication of an association between said queue pair in said first end node with a queue pair in said second end node.

5. The method according to claim 4, further comprising the steps of:

transmitting a packet from said second end node to said first end node utilizing a paiticular logical connection;

receiving, utilizing said first end node, said packet; and utilizing said table to determine whether said particular logical connection was previously established.

6. The method according to claim 5, wherein said step of utilizing said table to determine whether said particular logical connection was previously established further comprises the step of:

determining whether an indication is stored in said table of an association between a queue pair in said first end node with a queue pair in said second end node.

7. The method according to claim 1, further comprising the step of:

including said instance number in a transport header in each packet transmitted between said first and second end nodes during said logical connection.

8. The method according to claim 1, further comprising the step of:

including said instance number in a sequence number field in a transport header in each packet transmitted between said first and second end nodes during said logical connection.

9. The method according to claim 1, further comprising the step of:

including said instance number in each sequence number field included in packets transmitted between said first and second end nodes during said logical connection.

10. The method according to claim 1, further comprising the steps of:

determining whether said logical connection is a first logical connection between said first and second end nodes;

in response to a determination that said logical connection is a first logical connection:

associating an instance number with said logical connection;

including said instance number in each packet transmitted between said first and second end nodes during said logical connection, said instance number remaining constant during said logical connection; and using said instance number as a current instance number; and in response to a determination that said logical connection is not a first logical connection:

incrementing said current instance number;

using said incremented current instance number as a current instance number; and including said incremented current instance number in each packet transmitted between said first and second end nodes during said logical connection.

11. The method according to claim 1, further comprising the steps of:

losing said logical connection;

reestablishing said logical connection between said first and second end nodes executing no wait states between losing said logical connection and reestablishing said logical connection.

12. The method according to claim 1, further comprising the steps of:

transmitting a packet from said first end node to said second end node; and including a current instance number in said packet.

13. The method according to claim 1, further comprising the steps of:

receiving, by said second end node, a packet;

identifying, utilizing said second end node, an instance number included in said received packet;

determining a current instance number;

determining whether said instance number included in said received packet is said current instant number;

in response to a determination that said instance number included in said received packet is said current instant number, processing said packet normally by said second end node; and in response to a determination that said instance number included in said received packet is not said current instant number, discarding, by said second end node, said packet.

14. The method according to claim 1, further comprising the steps of:

after establishing said logical connection, setting, by said first end node, a sequence number;

incrementing said sequence number after each transmission of a packet from said first end node to said second end node;

after each transmission of a packet from said first end node to said second end node, setting a current sequence number equal to said incremented sequence number; and including a current sequence number in each packet transmitted from said first end node to said second end node.

15. A method for managing data transmitted from a first end node to a second end node in a data processing system, said method comprising the steps of:

establishing a logical connection between said first end node and said second end node prior to transmitting data between said first and second end nodes;

including a current sequence number in each packet transmitted from said first end node to said second end node, said current sequence number being incremented each time a packet is transmitted from said first end node to said second end node;

associating an instance number with said logical connection; and including said instance number in each sequence number field, said instance number remaining constant during said logical connection.

16. The method according to claim 15, further comprising the steps of:

reestablishing said logical connection between said first and second end nodes;

incrementing maid instance number, said incremented instance number being associated with said reestablished logical connection; and including said incremented instance number in each sequence number field, said incremented instance number remaining constant during said reestablished logical connection.

17. The method according to claim 15, wherein the step of establishing a logical connection between said first end node and said second end node further comprises the step of:

associating a queue pair in said first end node with a queue pair in said second end node.

18. The method according to claim 17, wherein said step of associating a queue pair in said first end node with a queue pair in said second end node further comprises the steps of:

establishing a table of queue pairs in said first end node; and storing within said table an indication of an association between said queue pair in said first end node with a queue pair in said second end node.

19. The method according to claim 18, further comprising the steps of:

transmitting a packet from said second end node to said first end node utilizing a particular logical connection;

receiving, utilizing said first end node, said packet; and utilizing said table to determine whether said particular logical connection was previously established.

20. The method according to claim 19, wherein said step of utilizing said table to determine whether said particular logical connection was previously established further comprises the step of:

determining whether an indication is stored in said table of an association between a queue pair in said first end node with a queue pair in said second end node.

21. The method according to claim 15, further comprising the steps of:

determining whether said logical connection is a first logical connection between said first and second end nodes;

in response to a determination that said logical connection is a first logical connection:

associating an instance number with said logical connection;

including said instance number in each sequence number field transmitted between said first and second end nodes during said logical connection; and using said instance number as a current instance number; and in response to a determination that said logical connection is not a first logical connection:

incrementing said current instance number;

using said incremented current instance number as a current instance number; and including said incremented current instance number in each sequence number field transmitted between said first and second end nodes during said logical connection.

22. The method according to claim 15, further comprising the steps of:

losing said logical connection; and reestablishing said logical connection between said first and second end nodes executing no wait states between losing said logical connection end reestablishing said logical connection.

23. The method according to claim 15, further comprising the steps of:

receiving, by said second end node, a packet;

identifying, utilizing said second end node, an instance number included in said received packet;

determining a current instance number;

determining whether said instance number included in said received packet is said current instant number;

in response to a determination that said instance number included in said received packet is said current instant number, processing said packet normally by said second end node; and in response to a determination tat said instance number included in said received packet is not said current instant number, discarding, by said second end node, said packet.

24. A data processing system for managing data transmitted from a first end node to a second end node in said data processing system, comprising:

means for establishing a logical connection between said first end node and said second end node prior to transmitting data between said first and second end nodes;

means for associating an instance number with said logical connection; and means for including said instance number in each packet transmitted between said first and second end nodes while said logical connection remains established, said instance number remaining constant during said logical connection.

25. The system according to claim 24, further comprising:

means for reestablishing said logical connection between said first and second end nodes;

means for incrementing said instance number, said incremented instance number being associated with said reestablished logical connection; and means for including said incremented instance number in each packet transmitted between said first and second end nodes during said reestablished logical connection, said incremented instance number remaining constant during said reestablished logical connection.

26. The system according to claim 24, wherein said means for establishing a logical connection between said first end node and said second end node further comprises:
means for associating a queue pair in said first end node with a queue pair in said second end node.

27. The system according to claim 26, wherein said means for associating a queue pair in said first end node with a queue pair in said second end node further comprises:
means for establishing a table of queue pairs in said first end node; and
means for storing within said table an indication of an association between said queue pair in said first end node with a queue pair in said second end node.

28. The system according to claim 27, further comprising:
means for transmitting a packet from said second end node to said first end node utilizing a particular logical connection;
means for receiving, utilizing said first end node, said packet; and
means for utilizing said table to determine whether said particular logical connection was previously established.

29. The system according to claim 28, wherein said means for utilizing said table to determine whether said particular logical connection was previously established further comprises:
means for determining whether an indication is stored in said table of an association between a queue pair in said first end node with a queue pair in said second end node.

30. The system according to claim 24, further comprising:
means for including said instance number in a transport header in each packet transmitted between said first and second end nodes during said logical connection.

31. The system according to claim 24, further comprising:
means for including said instance number in a sequence number field in a transport header in each packet transmitted between said first and second end nodes during said logical connection.

32. The system according to claim 24, further comprising:
means for including said instance number in each sequence number field included in packets transmitted between said first and second end nodes during said logical connection.

33. The system according to claim 24, further comprising:
means for determining whether said logical connection is a first logical connection between said first and second end nodes;
in response to a determination that said logical connection is a first logical connection:
means for associating an instance number with said logical connection;
means for including said instance number in each packet transmitted between said first and second end nodes during said logical connection, said instance number remaining constant during said logical connection; and
means for using said instance number as a current instance number; and
in response to a determination that said logical connection is not a first logical connection:
means for incrementing said current instance number;

means for using said incremented current instance number as a current instance number; and
means for including said incremented current instance number in each packet transmitted between said first and second end nodes during said logical connection.

34. The system according to claim 24, further comprising:
means for losing said logical connection;
means for reestablishing said logical connection between said first and second end nodes executing no wait states between losing said logical connection and reestablishing said logical connection.

35. The system according to claim 24, further comprising:
means for transmitting a packet from said first end node to said second end node; and
means for including a current instance number in said packet.

36. The system according to claim 24, further comprising:
means for receiving, by said second end node, a packet;
means for identifying, utilizing said second end node, an instance number included in said received packet;
means for determining a current instance number;
means for determining whether said instance number included in said received packet is said current instant number;
in response to a determination that said instance number included in said received packet is said current instant number, means for processing said packet normally by said second end node; and
in response to a determination that said instance number included in said received packet is not said current instant number, means for discarding, by said second end node, said packet.

37. The system according to claim 24, further comprising:
after establishing said logical connection, means for setting, by said first end node, a sequence number;
means for incrementing said sequence number after each transmission of a packet from said first end node to said second end node;
after each transmission of a packet from said first end node to said second end node, means for setting a current sequence number equal to said incremented sequence number; and
means for including a current sequence number in each packet transmitted from said first end node to said second end node.

38. A system for managing data transmitted from a first end node to a second end node in a data processing system, comprising:
means for establishing a logical connection between said first end node and said second end node prior to transmitting data between said first and second end nodes;
means for including a current sequence number in each packet transmitted from said first end node to said second end node, said current sequence number being incremented each time a packet is transmitted from said first end node to said second end node;
means for associating an instance number with said logical connection; and
means for including said instance number in each sequence number field, said instance number remaining constant during said logical connection.

39. The system according to claim 38, further comprising:
means for reestablishing said logical connection between said first and second end nodes;

means for incrementing said instance number, said incremented instance number being associated with said reestablished logical connection; and means for including said incremented instance number in each sequence number field, said incremented instance number remaining constant during said reestablished logical connection.

40. The system according to claim 38, wherein said means for establishing a logical connection between said first end node and said second end node further comprises:

means for associating a queue pair in said first end node with a queue pair in said second end node.

41. The system according to claim 40, wherein said means for associating a queue pair in said first end node wish a queue pair in said second end node further comprises:

means for establishing a table of queue pairs in said first end node; and means for storing within said table an indication of an association between said queue pair in said first end node with a queue pair in said second and node.

42. The system according to claim 41, further comprising:

means for transmitting a packet from said second end node to said first end node utilizing a particular logical connection;

means for receiving, utilizing said first end node, said packet; and means for utilizing said table to determine whether said particular logical connection was previously established.

43. The system according to claim 42, wherein said means for utilizing said table to determine whether said particular logical connection was previously established further comprises:

means for determining whether an indication is stored in said table of an association between a queue pair in said first end node with a queue pair in said second end node.

44. The system according to claim 38, further comprising:

means for determining whether said logical connection is a first logical connection between said first and second end nodes;

in response to a determination that said logical connection is a first logical connection:

means for associating an instance number with said logical connection;

means for including said instance number in each sequence number field transmitted between said first and second end nodes during said logical connection; and means for using said instance number as a current instance number; and in response to a determination that said logical connection is not a first logical connection:

means for incrementing said current instance number;

means for using said incremented current instance number as a current instance number; and means for including said incremented current instance number in each sequence number field transmitted between said first and second end nodes during said logical connection.

45. The system according to claim 38, further comprising:

means for losing said logical connection; and means for reestablishing said logical connection between said first and second end nodes executing no wait states between losing said logical connection and reestablishing said logical connection.

46. The system according to claim 38, further comprising:

means for receiving, by said second end node, a packet;

means for identifying, utilizing said second end node, an instance number included in said received packet;

means for determining a current instance number;

means for determining whether said instance number included in said received packet is said current instant number;

in response to a determination that said instance number included in said received packet is said current instant number, means for processing said packet normally by said second end node; and in response to a determination that said instance number included in said received packet is not said current instant number, means for discarding, by said second end node, said packet.

47. A computer readable storage medium when executed by a computer causes managing data transmitted from a first end node to a second end node in a data processing system, said computer readable storage medium comprising:

instruction means for establishing a logical connection between said first end node and said second end node prior to transmitting data between said first and second end nodes;

instruction means for associating an instance number with said logical connection; and instruction means for including said instance number in each packet transmitted between said first and second end nodes while said logical connection remains established, said instance number remaining constant during said logical connection.

48. The medium according to claim 47, further comprising:

instruction means for reestablishing said logical connection between said first and second end nodes;

instruction means for incrementing said instance number, said incremented instance number being associated with said reestablished logical connection; and instruction means for including said incremented instance number in each packet transmitted between said first and second end nodes during said reestablished logical connection, said incremented instance number remaining constant during said reestablished logical connection.

49. The medium according to claim 47, wherein said instruction means for establishing a logical connection between said first end node and said second end node further comprises:

instruction means for associating a queue pair in said first end node with a queue pair in said second end node.

50. The medium according to claim 49, wherein said instruction means for associating a queue pair in said first end node with a queue pair in said second end node further comprises:

instruction means for establishing a table of queue pairs in said first end node; and instruction means for storing within said table an indication of an association between said queue pair in said first end node wit a queue pair in said second end node.

51. The medium according to claim 50, further comprising:

instruction means for transmitting a packet from said second end node to said first end node utilizing a particular logical connection;

instruction means for receiving, utilizing said first end node, said packet; and instruction means for utilizing said table to determine whether said particular logical connection was previously established.

52. The medium according to claim 51, wherein said instruction means for utilizing said table to determine whether said particular logical connection was previously established further comprises:
instruction means for determining whether an indication is stored in said table of an association between a queue pair in said first end node with a queue pair in said second end node.

53. The medium according to claim 47, further comprising:
instruction means for including said instance number in a transport header in each packet transmitted between said first and second end nodes during said logical connection.

54. The medium according to claim 47, further comprising:
instruction means for including said instance number in a sequence number field in a transport header in each packet transmitted between said first and second end nodes during said logical connection.

55. The medium according to claim 47, further comprising:
instruction means for including said instance number in each sequence number field included in packets transmitted between said first and second end nodes during said logical connection.

56. The medium according to claim 47, further comprising:
instruction means for determining whether said logical connection is a first logical connection between said first and second end nodes;
in response to a determination that said logical connection is a first logical connection:
instruction means for associating an instance number with said logical connection;
instruction means for including said instance number in each packet transmitted between said first and second end nodes during said logical connection, said instance number remaining constant during said logical connection; and
instruction means for using said instance number as a current instance number; and
in response to a determination that said logical connection is not a first logical connection:
instruction means for incrementing said current instance number;
instruction means for using said incremented current instance number as a current instance number; and
instruction moans for including said incremented current instance number in each packet transmitted between said first and second end nodes during said logical connection.

57. The medium according to claim 47, further comprising:
instruction means for losing said logical connection;
instruction means for reestablishing said logical connection between said first and second end nodes executing no wait states between losing said logical connection and reestablishing said logical connection.

58. The medium according to claim 47, further comprising:
instruction means for transmitting a packet from said first end node to said second end node; and
instruction means for including a current instance number in said packet.

59. The medium according to claim 47, further comprising:
instruction means for receiving, by said second end node, a packet;
instruction means for identifying, utilizing said second end node, an instance number included in said received packet;
instruction means for determining a current instance number;
instruction means for determining whether said instance number included in said received packet is said current instant number;
in response to a determination that said instance number included in said received packet is said current instant number, instruction means for processing said packet normally by said second end node; and
in response to a determination that said instance number included in said received packet is not said current instant number, instruction means for discarding, by said second end node, said packet.

60. The medium according to claim 47, further comprising:
after establishing said logical connection, instruction means for setting, by said first end node, a sequence number;
instruction means for incrementing said sequence number after each transmission of a packet from said first end node to said second end node;
after each transmission of a packet from said first end node to said second end node, instruction means for setting a current sequence number equal to said incremented sequence number; and
instruction means for including a current sequence number in each packet transmitted from said first end node to said second end node.

61. A computer readable storage medium when executed by a computer causes managing data transmitted from a first end node to a second end node in a data processing system, said computer readable storage medium comprising:
instruction means for establishing a logical connection between said first end node and said second end node prior to transmitting data between said first and second end nodes;
instruction means for including a current sequence number in each packet transmitted from said first end node to said second end node, said current sequence number being incremented each time a packet is transmitted from said first end node to said second end node;
instruction means for associating an instance number with said logical connection; and
instruction means for including said instance number in each sequence number field, said instance number remaining constant during said logical connection.

62. The medium according to claim 61, further comprising:
instruction means for reestablishing said logical connection between said first and second end nodes;
instruction means for incrementing said instance number, said incremented instance number being associated with said reestablished logical connection; and
instruction means for including said incremented instance number in each sequence number field, said incremented instance number remaining constant during said reestablished logical connection.

63. The medium according to claim 61, wherein said instruction means for establishing a logical connection between said first end node and said second end node further comprises:
   instruction means for associating a queue pair in said first end node with a queue pair in said second end node.

64. The medium according to claim 63, wherein said instruction means for associating a queue pair in said first end node with a queue pair in said second end node further comprises:
   instruction means for establishing a table of queue pairs in said first end node; and
   instruction means for storing within said table an indication of an association between said queue pair in said first end node with a queue pair in said second end node.

65. The medium according to claim 64, further comprising:
   instruction means for transmitting a packet from said second end node to said first end node utilizing a particular logical connection;
   instruction means for receiving, utilizing said first end node, said packet; and
   instruction means for utilizing said table to determine whether said particular logical connection was previously established.

66. The medium according to claim 65, wherein said instruction means for utilizing said table to determine whether said particular logical connection was previously established further comprises:
   instruction means for determining whether an indication is stored in said table of an association between a queue pair in said first end node with a queue pair in said second end node.

67. The medium according to claim 61, further comprising:
   instruction means for determining whether said logical connection is a first logical connection between said first and second end nodes;
   in response to a determination that said logical connection is a first logical connection:
      instruction means for associating an instance number with said logical connection;
      instruction means for including said instance number in each sequence number field transmitted between said first and second end nodes during said logical connection; and
      instruction means for using said instance number as a current instance number; and
   in response to a determination that said logical connection is not a first logical connection:
      instruction means for incrementing said current instance number;
      instruction means for using said incremented current instance number as a current instance number; and
      instruction means for including said incremented current instance number in each sequence number field transmitted between said first and second end nodes during said logical connection.

68. The medium according to claim 61, further comprising:
   instruction means for losing said logical connection; and
   instruction means for reestablishing said logical connection between said first and second end nodes executing no wait states between losing said logical connection and reestablishing said logical connection.

69. The medium according to claim 61, further comprising:
   instruction means for receiving, by said second end node, a packet;
   instruction means for identifying, utilizing said second end node, an instance number included in said received packet;
   instruction means for determining a current instance number;
   instruction means for determining whether said instance number included in said received packet is said current instant number;
   in response to a determination that said instance number included in said received packet is said current instant number, instruction means for processing said packet normally by said second end node; and
   in response to a determination that said instance number included in said received packet is not said current instant number, instruction means for discarding, by said second end node, said packet.

* * * * *